United States Patent [19]

Grün

[11] 4,390,352

[45] Jun. 28, 1983

[54] HEAT EXCHANGER

[76] Inventor: Ingo Grün, D-4300 Essen, Fed. Rep. of Germany

[21] Appl. No.: 245,354

[22] Filed: Mar. 19, 1981

[30] Foreign Application Priority Data

Mar. 29, 1980 [DE] Fed. Rep. of Germany ....... 3012286

[51] Int. Cl.³ .......................................... B01D 53/04
[52] U.S. Cl. ..................................... 55/208; 55/269; 55/387; 165/179; 165/185
[58] Field of Search ................. 55/208, 209, 269, 316, 55/387; 165/164, 179, 185, DIG. 12

[56] References Cited

U.S. PATENT DOCUMENTS

| | | | |
|---|---|---|---|
| 2,492,298 | 12/1949 | Lenning | 165/179 X |
| 2,947,152 | 8/1960 | Bloem | 165/164 X |
| 2,970,669 | 2/1961 | Bergson | 55/269 |
| 3,225,524 | 12/1965 | Berrian | 165/185 X |
| 3,327,779 | 6/1967 | Jacoby | 165/185 |
| 3,895,675 | 7/1975 | Rein et al. | 165/179 X |

FOREIGN PATENT DOCUMENTS

| | | | |
|---|---|---|---|
| 2455338 | 5/1976 | Fed. Rep. of Germany | 165/179 |
| 52-18414 | 5/1977 | Japan | 55/269 |

OTHER PUBLICATIONS

Hopfenberg, Polymer Science & Technology, vol. 6, Permeability of Plastic Films & Coatings to Gases, Vapors, & Liquids, 1974, pp. 301–320.

Primary Examiner—Robert H. Spitzer
Attorney, Agent, or Firm—Merchant & Gould

[57] ABSTRACT

A heat exchanger has at least two channels, separated from each other by a wall, for the flow therethrough of fluids such as gases. It is desired that heat exchange should take place between the fluids. The wall is made of a material which is poorly heat-conducting and is penetrated by heat-conducting pins projecting into both channels. The wall is made of a flexible film and the pins are inserted into the film at any desired locations.

6 Claims, 2 Drawing Figures

HEAT EXCHANGER

FIELD OF THE INVENTION

This invention relates to a heat exchanger which has at least two channels, separated from each other by a wall, for flow therethrough of fluids such as gas, between which a heat exchange is to take place, the wall being formed of a material which is poorly heat-conducting and being penetrated by heat conducting pins projecting into both channels.

BACKGROUND OF THE INVENTION

Numerous types of recuperative heat exchangers for air flows are known. They usually have stationary plates which are positioned in parallel and are made, for example, of glass or metal and they separate from one another the two air flows between which the heat exchange is to take place. Heat transfer occurs because of the good heat conductivity of the plates, which may also have a profiled surface for this purpose, if they are made of metal. In order to further enlarge the heat exchange surface, it is also known to position several plates parallel to each other with the two air flows being guided alternately through the slits between the plates. This gives a compact design which is economically valuable.

The known heat exchangers mentioned above may be installed, for example, in channels with a square or rectangular cross section, but are less suitable for installation into narrow air slits, because their heat-exchanging surface is too small for this purpose. Another disadvantage of these known heat exchangers is that heat conduction not only takes place perpendicularly to the plates separating the air flows, but also takes place in the longitudinal direction of the plates due to the good heat conductivity thereof. However, this phenomenon is undesirable because it reduces the temperature difference by virtue of which the air flows are cooled or heated when flowing through the heat exchanger. The greater this temperature difference, the higher the efficiency of the heat exchanger A further disadvantage is that the heat from the air flows is only transferred from their layers bordering on the plates and accordingly, the cross section of flow should be as small as possible. Consequently, the heat exchanger should be fitted with as many heat exchange plates as possible, which correspondingly increases the cost. If the surface is profiled to a substantial extent, a turbulent air flow is produced, as a result of which, however, the flow resistance is considerably increased, so that the flow velocity is reduced with a consequent reduction in the efficiency of the heat exchanger.

U.S. Pat. No. 3,895,675 discloses a breathing apparatus which, in a hollow housing made of poorly heat-conducting material, such as glass fibre reinforced polyester, contains dividing walls extending in longitudinal direction made of the same material and contains pins penetrating these dividing walls perpendicularly to the direction of flow, the pins being made of good heat-conducting material, such as copper and extending from wall to wall through the channel and the dividing walls and ensuring heat transfer between the neighbouring flow sections of the heat exchanger which is designed for intermittent operation. In this manner, storage of heat in, and heat conduction along, the dividing walls is reduced, and it ensures that heat exchange does not only take place between the regions of the air flows directly bordering on the dividing walls. However, because the dividing walls of the heat exchanger are relatively rigid, the heat exchange pins have to be designed so that they fit exactly and have to be installed in corresponding openings. A heat exchange takes place at all events, but moisture is not also transferred between the air flows which are in counterflow to one another.

SUMMARY OF THE INVENTION

The object of the invention is to provide a heat exchanger which is easy to install even in narrow locations, which in particular is of a flat design and is cheap to produce and which, even in an extremely flat construction still operates with a very high efficiency.

According to the invention there is provided a heat exchanger having at least two channels, separated from each other by a wall, for flow therethrough of fluids, wherein the wall is made of a flexible film of poorly heat-conducting material which is penetrated by heat-conducting pins projecting into both channels, whereby heat-exchange takes place between the two fluid flows.

In contrast to known heat exchangers, the dividing wall between the waste gas flows is therefore not of a rigid design, but is flexible so that the heat exchanger is not only constructed very flat, but may also be brought into complex forms, because the dividing wall consisting of a flexible film may be easily installed not only in straight channels, but also in curved, angled or any other channels. Positioning of the heat exchange pins is easy to carry out, because the pins are simply pierced through the film as required and, accordingly, pre-fabricated holes are unnecessary. Due to the flexibility or elasticity of the film, the material thereof is positioned in a sealing manner against the penetrating pins which therefore only need to be inserted and are then completely and automatically operative.

The film is preferably made of plastics material such as polyvinyl chloride which has an adequate strength and an adequate flexibility and elasticity in order to perform the required function as a dividing wall into which the heat conducting pins merely have to be inserted.

The film preferably contains a textile insert with a comparatively large mesh width which improves the supporting capacity thereof, so that the film cannot be permanently deformed under the weight of the pins which are inserted. The relatively large mesh width of the textile insert ensures that when the pins are inserted, each meets with an opening in the textile insert and accordingly, the insert does not oppose the insertion of the pins with any substantial resistance. A wide-meshed textile is adequate for appreciably increasing the supporting capacity of the flexible film which is also elastic to a certain extent.

According to another feature of the invention, the film may be permeable to moisture. In this manner, a moisture exchange also takes place between the gas flows, between which a heat exchange is required. Moisture exchange is effected by moisture resulting from condensation from the cooling air flow passing into the flow of gas to be heated and evaporating there. As a result of this, not only does the flow of gas to be heated receive moisture, but also additionally enthalpy is obtained. A heat exchanger designed in this manner is particularly well suited for climatic devices and for room ventilation purposes.

According to another feature of the invention, the heat exchange pins terminate between the external walls of the neighbouring channels of the heat exchanger, so that heat transport does not take place to these walls and the installation of the dividing wall designed as a flexible film may be carried out in a particularly simple manner between the neighbouring channels, i.e. only the film, and not the pins as well, has to be secured to the external walls of the heat exchanger.

The ends of the pins are preferably widened, for example, flattened, so that they present an enlarged heat transfer surface at locations remote from the dividing wall.

Furthermore, at least some of the heat-conducting pins may be designed so that they are moisture-permeable, for example they may contain a core in the nature of a wick, so that condensing atmospheric moisture is transported from the cooling air flow into the heated air flow and may there evaporate.

The heat exchanger according to the invention is particularly suitable for installation into facades, external walls, roofs etc. of buildings for a decentral recovery of heat from spatial air which is removed, due to its flat design and to the possibility of easily providing it with complex forms. Although the heat exchanger has a very good efficiency even with only one dividing wall consisting of a flexible film, more dividing walls of this type may also be positioned parallel to each other to give a larger flow cross section.

The outer walls of the heat exchanger may be made of sound absorbent material so that the exchanger has a sound insulating effect which meets the increasing demand for room ventilation with noise control. The heat exchanger according to the invention is therefore particularly suitable for room ventilation installations and climatic installations in residential premises.

BRIEF DESCRIPTION OF THE DRAWINGS

An embodiment of the heat exchanger according to the invention is shown schematically in the drawings.

DETAILED DESCRIPTION OF PREFERRED EMBODIMENT

Figure 1:
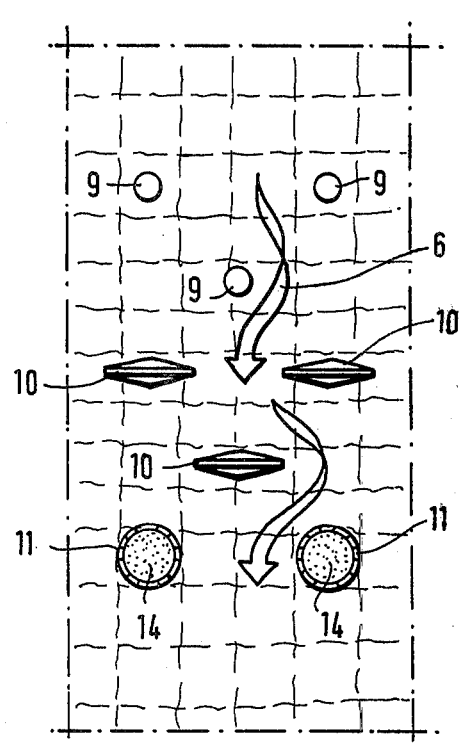
FIG. 1 illustrates a longitudinal section through the heat exchanger.

The heat exchanger illustrated in FIG. 1 has a housing 1 consisting of sound absorbent material, whose interior space 2 is divided into two channels 4 and 5, which run parallel to each other, by a flexible film 3. Air passes through the channels 4 and 5 in counterflow as indicated by the arrows 6 and 7, and heat exchange takes place between these air flows. The flexible film 3 consists of a plastics material such as polyvinyl chloride which has a certain elasticity and the film 3 contains a wide-meshed textile insert 8. The material of the film 3 is substantially non heat conducting.

Figure 2:
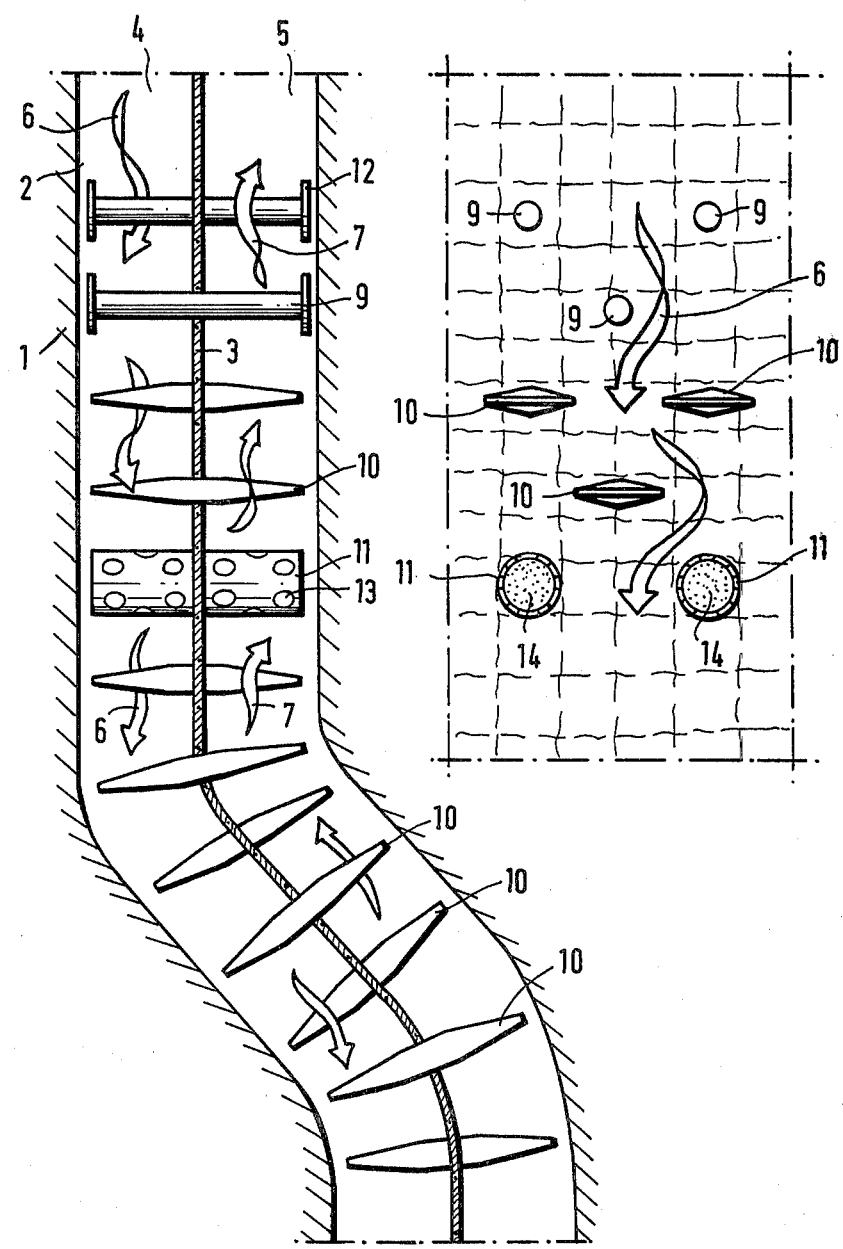
FIG. 2 illustrates a top view on the film forming the dividing wall inside the heat exchanger, with various embodiments of heat exchange pins.

Pins 9,10 or 11 are pierced through the film 3 to effect heat exchange between the channels 4 and 5. It may be seen from FIG. 2 that each of these pins is pushed in through an opening between the crossing-over threads of the wide-meshed textile insert 8. All the pins 9,10 and 11 terminate at a small distance from the inside wall of the housing 1 which, as shown in FIG. 1, may be of a straight design or may also be of a more complex form, for example curved.

The pins 9 are cylindrical pins each with a widened head 12, whereas the pins 10 are flattened. The pins 9 and 10 may alternatively be in the form of hollow bodies and may have a ribbed or corrugated surface, so that for example, they take up heat from the air flow passing through the channel 4 and transfer it through the film 3 into the counterflowing air flow in the channel 5. By suitable positioning and shaping of the pins 9 or 10, the air flows may be diverted between the pins, as indicated by the arrows 6 in FIG. 2 so that each part of the air comes into direct contact, as far as possible, with the pins and the heat transfer is at an optimum. Owing to the flat heads 12 of the pins 9 or to the specific shaping of the pins 10, a favourable combination is obtained between a large surface of the pins in the air flow and a large complete cross section of the pins for a good heat conduction between the channels 4 and 5.

The pins 11 are of a hollow design and contain openings 13 in their walls. A water-absorbent filling 14 contained in each pin comes into optimum contact with the air flows. This filling 14 acts as a wick to cause transfer of heat and of moisture between the channels 4 and 5. Alternatively, the pins themselves may also be of a porous design and may be filled with capillaries in order to act as a wick.

During the assembly of the heat exchanger, the flexible film 3 is introduced into the exchanger, for example may be firmly clamped between two parts forming the housing thereof. A further connection is unnecessary, because the pins 9,10 and 11 are only secured to the film 3 and should not come into contact with the housing 1 of the heat exchanger. They ensure an optimum heat transfer in the smallest space even when the heat exchanger is of a complex form.

I claim:

1. A heat exchanger having at least two channels for the flow therethrough of fluids, comprising:
   (a) a flexible, generally non heat-conducting wall separating the channels, said non heat-conducting wall substantially precluding the transmission of heat along said flexible wall; and
   (b) heat conducting pins extending through said flexible wall into the channels on either side of said wall, the ends of said pins being removed from said flexible wall, said pins further being supported by said flexible wall and cooperating with said flexible wall to provide a seal therebetween, said flexible wall enabling the pins to pierce said flexible wall without necessitating the previous formation of perforations adapted for receipt of the pins.

2. A heat exchanger having at least two channels for the flow therethrough of fluids, comprising:
   (a) a flexible wall having poor thermal conductivity characteristics;
   (b) a plurality of heat conducting pins mounted in said wall, said pins extending through said wall on either side of said flexible wall, said pins being supported by said flexible wall and cooperating with said wall to form a seal, said flexible wall and said pins cooperating to preclude the transmission of heat along said flexible wall in the direction of fluid flow and facilitate heat transmission through said flexible wall along said heat conducting pins between the channels, said pins being mounted in said flexible wall by pushing the pins through said flexible wall such that prefabricated holes adapted for receipt of the pins are unnecessary.

3. A heat exchanger in accordance with claim 2, wherein said pins extend in a direction generally normal to said flexible wall.

4. A heat exchanger in accordance with claim 2, wherein said flexible wall includes a textile insert, said mesh-like insert having a relatively large mesh so that said elongated members can pass through said flexible wall between strands of the insert.

5. A heat exchanger in accordance with claim 2, wherein at least some of the pins are permeable to moisture.

6. A heat exchanger in accordance with claim 2, wherein the flexible wall is made of polyvinyl chloride.

* * * * *